United States Patent Office 3,433,769
Patented Mar. 18, 1969

3,433,769
CURING SYSTEM FOR ETHOXYLINE RESINS CONSISTING OF A SOLUTION OF PHOSPHOMOLYBDIC ACID AND A HYDROXY PHOSPHATE ESTER
Paul W. Juneau, Jr., Plymouth Township, Pa., assignor to the United States of America as represented by the Secretary of the Air Force
No Drawing. Filed Nov. 12, 1965, Ser. No. 507,592
U.S. Cl. 260—58
Int. Cl. C08g 30/10, 51/78
2 Claims

ABSTRACT OF THE DISCLOSURE

Process for curing an epoxy novolak resin at room temperature by reacting the resin with a solution made up of phosphomolybdic acid and a hydroxy containing phosphate ester.

---

This invention relates to a new and improved room temperature cured epoxy resin and to the process by which it is made.

Past practices in the compounding and in the production and in the uses of resins, plastics, rubbers, and the like, are presented in the U.S. issued Patents Nos. 3,158,591, 3,062,841, 3,057,880, 3,019,202, 3,018,294, 3,018,259, 3,017,387, and the like.

The epoxy or the vicinal epoxy group, that is characterized by the presence of the oxirane ring structure

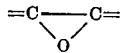

is found in these compositions with and without curing agents, hardeners, catalysts, etc. Many of the compositions are heated, as by refluxing in making resins, polymers, varnishes, rubbers, and the like. Oxirane, 1,2-epoxyethane or ethylene oxide has the composition $(CH_2)_2O$.

The objects of the present invention are to provide a new and improved epoxy resin cross-linked composition and the process by which it is made at room temperature of about 22° C. and one atmosphere of pressure and without supplying heat to the reaction.

This invention is a novel curing process for making a new and improved epoxy resin at room temperature from a solution containing phosphomolybdic acid $$(20MoO_3 \cdot 2H_3PO_4 \cdot 48H_2O)$$

in a phosphate ester containing one or more OH groups with or without the presence of active hydrogens.

This solution, when mixed with an epoxy resin and cured at room temperature provides a cross-linked material without the supplying of heat to the reaction.

The resulting cured cross-linked material exhibits ablative properties that are equal to or that are improvements over phenolic nylon laminates when they are tested in a Linde torch.

The process for making the material here of interest is based on the synergistic reaction of phosphomolybdic acid of the compositions $20MoO_3 \cdot 2H_3PO_4 \cdot 48H_2O$ dissolved in a hydroxyl compound containing a phosphate ester with an epoxy resin.

The process comprises the stirring of the phosphomolybdic acid into the phosphate ester until dissolution is complete. The resulting mixture is then stirred into the epoxy resin. The ensuing reaction is exothermic with the formation of cross-linkages throughout the product. The reaction time depends on the ratio between the phosphoric acid, the esters formed and the epoxy present.

Typical representative formulations, with the respective gel times are:

| Phosphomolybdic acid (g.) | Phosphate ester (Vircol 82) (g.) | Epoxy resin (DP 419) (g.) | Gel time (min.) |
|---|---|---|---|
| 1 | | 39 | 100 | 60 |
| 2 | | 39 | 100 | 30 |
| 3 | | 37 | 100 | 8 |
| 4 | | 36 | 100 | 1.5 |

An illustrative sample that contained 2 g. of phosphomolybdic acid displayed Linde ablative weight losses of about 0.1 gram per second.

It is believed that the combination of a hydroxyl containing phosphate ester with a phosphomolybdic acid effects the cure of an epoxy resin. This belief stems from the failure of a nonhydroxyl containing phosphate ester containing dissolved phosphomolybdic acid to cure an epoxy resin after having been incorporated with the system for 6 hours. When a primary amine, and experimentally triethylenetetramine was added to the mixture containing the epoxy resin, hydroxylated ester and phosphomolybdic acid, the retardation of cure took place until enough amine had been added to neutralize the acid and to react with the epoxy groups.

The good ablative properties of the phosphomolybdic acid hydroxylated phosphate ester cured epoxy novolak confirmed the value of the process and product that are here described. Successful previously made ablation compounds were based on anhydride cured materials using an ablation promoter as an additive.

Modifications of the present invention illustratively involve the use of other solvents for the phosphomolybdic acid, and resins other than the epoxy resin cited as base material.

The cured material can be used as a shield repair material for patching holes in ablative heat shields that have been damaged, as ablative material formed in place, and the like. The material serves as an adhesive in attaching components to ablative heat shields, and to aluminum bodies of vehicles subjected to extreme velocities and temperatures on encountering high speed re-entry into the upper atmosphere. The material serves in other casting, adhesive and laminating applications of a related nature.

Illustrative examples of epoxy resins that are suitable for accomplishing the reaction that is contemplated hereby are listed on pages 1545 through 1547 with properties described in column 19, page 1559, of the Handbook of Chemistry and Physics, 43rd edition, published by the Chemical Rubber Publishing Company, 2310 Superior Avenue NE., Cleveland, Ohio.

As appearing herein the words Vircol 82 and DP 419 in the table are trademarks registered respectively to the companies Virginia-Carolina Chemical Company and Ciba Corporation.

In chemical terminology Vircol 82 is a hydroxyl rich phosphate ester and DP 419 is a modified novolak epoxy resin.

An illustrative example of a phosphate ester containing an OH group and that accomplishes results that are described herein is

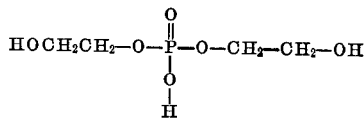

It is to be understood that the reactants such as the phosphomolybdic acid submitted hereby are applicable to epoxy resins containing the epoxy group

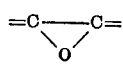

I claim:
1. A method of curing a novolak epoxy resin at room temperature comprising the steps of mixing phosphomolybdic acid with a hydroxy containing phosphate ester of the structure

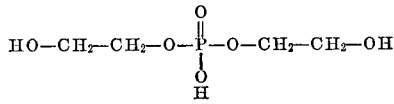

and thereafter reacting the resulting mixture with a novolak epoxy resin.

2. The method according to claim 1 where the formulation comprises one to four parts by weight of phosphomolybdic acid, thirty six to thirty nine parts by weight of the phosphate ester and one hundred parts by weight of a novolak epoxy resin and the reaction is carried out for a period of sixty to one and one half minutes, the longest reaction period being employed where the last amount of acid is used.

References Cited

UNITED STATES PATENTS

| | | | |
|---|---|---|---|
| 2,541,027 | 2/1951 | Bradley | 148—6.15 |
| 2,849,418 | 8/1958 | Fang | 260—836 |
| 3,268,468 | 8/1966 | Barnstorff et al. | 260—30.6 |
| 3,364,159 | 1/1968 | Hecker et al. | 260—18 |

WILLIAM H. SHORT, *Primary Examiner.*

H. SCHAIN, *Assistant Examiner.*

U.S. Cl. X.R.

161—227, 257; 260—2, 32.6, 59, 47, 51, 51.5; 263—50